UNITED STATES PATENT OFFICE 2,137,602

WASHING OUT OF WEAK GASEOUS ACIDS FROM GASES CONTAINING THE SAME

Hans Baehr, Leuna, Helmut Mengdehl, Huels, and Wilhelm Wenzel, Leuna, Germany, assignors to I. G. Farbenindustrie Aktiengesellschaft, Frankfort-on-the-Main, Germany No Drawing. Application August 26, 1936, Serial No. 98,096. In Germany November 28, 1933

2 Claims. (Cl. 23—2)

The present invention relates to improvements in the washing out of weak gaseous acids from gases containing the same.

Different processes are already known according to which weak gaseous acids, such as carbon dioxide, hydrocyanic acid, sulphur dioxide and hydrogen sulphide are washed out from gases by means of liquid alkaline purifying agents which are then regenerated more or less completely by heating. For example alkaline-reacting salts of weak acids or organic bases, as for example triethanol amine or monoethanol amine, in the free state or together with boric acid for reducing the volatility of the bases in aqueous solution may be employed for this purpose. According to another method solutions of sodium or potassium carbonate are employed which are then freed from the absorbed weak gaseous acids by heating or by applying a vacuum. For the removal of hydrogen sulphide it has been proposed to employ sodium arsenite solutions or suspensions of iron hydroxide in sodium carbonate solutions, the hydrogen sulphide absorbed by these agents being converted into sulphur by oxidation with air whereby the purifying agent is regenerated. It has now been found that in some cases the absorptive power of the purifying agents for the gases to be absorbed decreases continually so that in a more or less short time a satisfactory purification of the gases can no longer be obtained by the washing and the purifying agents must be regenerated by a troublesome method differing from the usual regeneration. It has been found that this is especially the case with all gases containing cyanogen, such as coke oven gases and distillation illuminating gas. Of the cyanogen compounds contained in such gases, dicyanogen appears mainly to effect the deterioration of the washing solutions. This is probably due to the fact that the alkaline liquid reacts with the dicyanogen according to the equation:—

$$2MeOH + (CN)_2 = MeCN + MeCNO + H_2O$$

The cyanate formed can no longer be split up by heating the solution because the cyanic acid is not volatile. In this way a diminution in the absorptive capacity of the purifying agent takes place which leads either to the necessity of treating the gas with very large amounts of liquid in order to effect a sufficient purification or to the necessity of replacing solutions still containing substantial amounts of efficient purifying agent by fresh solutions. Moreover, the spent solutions are difficult and troublesome to work up, because they contain mixtures of several substances which are difficultly separable from each other.

Similar troubles are experienced, when the gas to be purified contains hydrocyanic acid. This is only partly expelled in the regeneration of the alkaline washing liquid, apparently because the remainder is saponified with the formation of formic acid which is not expelled in the regeneration and therefore accumulates in the liquid and reduces its efficiency.

Now, the present invention relates to a process, by which these drawbacks are avoided and even in the case of gases containing cyanogen and/or sulphur dioxide a deterioration in the absorptive capacity of the purifying agent is prevented.

The process according to this invention consists in first removing from the gases in a first or preliminary washing stage by means of a liquid alkaline agent all the constituents which form compounds with the alkaline purifying agent to be used in the second or main washing stage which are incapable or difficultly capable of regeneration, and then carrying out the purification proper of the gases in a second or main stage the purifying agent used in the latter always being completely regenerated and returned to circulation without waste.

For the treatment of the gases in the first or preliminary washing stage may be mentioned especially all aqueous alkaline solutions, as for example of sodium carbonate, potassium carbonate, ammonia or ammonium carbonate, and also suspensions of calcium hydroxide or magnesium hydroxide. The employment of ammonia or ammonium carbonate solutions is especially advantageous in coke oven and illuminating gas plants because such solutions are always available as a by-product in such plants, which solutions may be directly employed. The other bases also need not be employed in a pure state. For example waste solutions which have an alkaline reaction are sufficient.

For the production of the alkaline liquid for the preliminary purification of the gases, organic nitrogenous substances may also serve, as for example amines and their substitution products or amino-alcohols, such as pyridine, quinoline, triethanol amine, carbamates and other compounds containing $NH_2$ groups. These may be employed either as such or in aqueous or organic solvents, as for example in washing oil, paraffin oil and petroleum. Among the said substances those are the most advantageous which have a high nitrogen content and therefore have a strongly basic character and are difficultly volatile. More readily volatile bases may, however, also be employed. In the latter case, and also when employing ammonia or its compounds, care is preferably taken that the volatile bases carried along by the gases are separated therefrom before the latter come into contact with the washing liquid in the second or main washing stage. This may be effected by any of the known methods for the separation of such bases, as for example by treatment with a washing liquid having a purely physical action, such as water, or an agent which exerts a chemical action, such as sulphuric acid.

The first or preliminary washing stage may also be carried through with an alkaline agent having the same composition as the agent used in the second or main purification. In that case the bulk of the alkaline agent serving in the second stage may be used over and over again, because it remains unchanged and its efficiency is not impaired. On the other hand, the agent used in the first stage may be used for the preliminary purification of the gases, until it is converted practically completely into the substance or substances incapable or difficultly capable of regeneration, and then worked up in a suitable manner.

Particularly valuable results are obtained in the process according to this invention by treating the gases in the first or preliminary washing stage in a scrubbing tower or the like with an aqueous solution of ammonia or of alkali metal carbonates which is passed in a circular course through the said scrubbing tower or the like and then over sulphur. In the scrubbing a little ammonium sulphide or alkali metal sulphide is first formed due to the presence of hydrogen sulphide in the gas, which is converted into ammonium or alkali metal polysulphide by contact with the sulphur. The cyanogen compounds taken up from the gas are then converted into ammonium or alkali metal thiocyanate which accumulates in the solution. Instead of passing the alkali metal carbonate solution over sulphur, it may be led into contact with heavy metal oxides or hydroxides, as for example iron oxide, such as bog iron ore, whereby alkali metal ferrocyanide is formed.

Good results are also obtained in the first washing stage by employing sodium carbonate solution containing some iron oxide, as for example bog iron ore, in suspension. By reaction with hydrogen cyanide, sodium ferrocyanide is formed.

Although the first or preliminary washing stage of the process according to this invention may be carried out in the cold, it is sometimes advantageous to use elevated temperatures, as for example those up to 100° C., when employing aqueous solutions. This effects a more rapid destruction of the cyanogen and also a more ready expulsion of the volatile gases, such as carbon dioxide and hydrogen sulphide, absorbed in the alkaline medium at the same time and intended to be absorbed only in the second or main washing stage. Furthermore an increase in the pressure results in a more rapid removal of the injurious cyanogen compounds from the gases.

The first or preliminary washing stage may be carried out by any method by which flowing gases are brought into intimate contact or reaction with liquids. For example any kind of washing vessel, especially washing towers, may be employed in which the alkaline liquid flows over filler bodies while at the same time the gas flows through. In the purification of hot gases it is preferable to trickle with the alkaline liquid an indirect cooler serving to cool the gases. The alkaline liquid may be used several times for trickling, the said liquid, after each treatment or only after the last treatment, being subjected to a thermal treatment or treated in some other manner, as for example by leading a gas through or by employing reduced pressure, in order to expel absorbed volatile gases, such as hydrogen sulphide or carbon dioxide. When the alkaline medium is to be utilized as much as possible for the combination of the obnoxious substances and the other acids, such as hydrogen sulphide and carbon dioxide which have also been bound are to be expelled completely, it is advantageous to bring the liquid which is saturated to a great extent into contact only with fresh crude gas because then the volatile acids escape again. The total amount of base is thus used for the removal of the obnoxious substances.

The solutions derived from the first or preliminary washing stage of the process may be further treated or employed in different ways depending on the base used. Thus, when aqueous ammonia has been used for the preliminary washing, the ammonia may be regenerated from the spent solution by heating with lime or sodium carbonate, the ammonia being further worked up in any desired manner and the nitrogen content of the calcium or sodium cyanate utilized for fertilizing or other purposes. If the hydroxides or carbonates of the alkali or alkaline earth metals be employed for the preliminary washing, the cyanate solutions may be further worked up for the purpose of isolating the cyanates or for the preparation of other products therefrom.

The second stage of the process according to this invention is carried out in the manner usual for the removal of weak acids by means of the said alkaline liquids.

The following examples will further illustrate how this invention may be carried out in practice but the invention is not restricted to these examples.

*Example 1*

Coke oven gas containing 7.8 grams of hydrogen sulphide, 1.2 grams of cyanogen compounds and 2 per cent by volume of carbon dioxide per cubic meter is trickled in a washer with the gas-water derived from the coke oven plant. 1 cubic meter of the said liquid being employed for each 300 cubic meters of gas. The gas-water is repeatedly circulated, one fifth thereof being continuously replaced by fresh gas-water while the fifth removed is worked up in the usual manner. The gas thus treated is freed from its ammonia content in the usual manner by means of sulphuric acid and then trickled in a washing tower charged with Raschig rings with a 30 per cent aqueous solution of the sodium salt of alanine, 1 cubic meter of the washing solution being employed for 800 cubic meters of gas. The gas is then free from hydrogen sulphide. The said washing solution is regenerated in the usual manner and employed for the purification of further gas. No diminution in the absorptive capacity of the washing solution by reason of the injurious action of cyanogen compounds takes place; for example if the absorptive capacity of the sodium salt of the alanine before use is 36 cubic meters of $CO_2$ and $H_2S$ per cubic meter of solution the absorptive capacity after 24 hours without previous washing with ammonia water is 28 cubic meters of $CO_2$ and $H_2S$ per cubic meter of solution while with the previous washing with ammonia water the absorptive capacity remains as before at 36 cubic meters.

*Example 2*

Crude illuminating gas is trickled in a washing tower with an 8 per cent solution of sodium carbonate at about 85° C.

1 cubic meter of the solution being employed for each 400 cubic meters of gas. The amount of sodium carbonate combined by the formation of cyanate is replaced by the addition of sodium carbonate until the solution has a sufficiently high concentration of sodium cyanate to render possible its recovery by evaporation. The gas is then trickled in known manner in a second washer with an aqueous 50 per cent solution of triethanol amine which is regenerated again by heating. The triethanol amine solution has an absorptive capacity of 22 cubic meters of $CO_2$ and $H_2S$ per cubic meter at the start under the reaction conditions. Without previous washing with sodium carbonate solution this decreases after 24 hours to 18 cubic meters and after another 24 hours to 15 cubic meters, while with the previous washing with sodium carbonate the saturation value of 22 cubic meters of $CO_2$ and $H_2S$ remains unaltered after 8 days.

Example 3

Crude coke oven gas containing per cubic meter 5 grams of ammonia, 12 grams of hydrogen sulphide and 1.2 grams of hydrocyanic acid is trickled in a washer with water which takes up from the gas not only the hydrocyanic acid but also certain amounts of ammonia and hydrogen sulphide in accordance with the partial pressures of these substances. The solution thus obtained is passed through a container charged with lumps of sulphur. A weak solution of ammonium polysulphide is thus formed which is returned to the washer for treating further amounts of gas. By the hydrocyanic acid taken up from the gas ammonium thiocyanate is formed in the solution and may be accumulated therein by repeated use for example until its concentration is 40 per cent. For each 1000 cubic meters of gas from 4 to 5 cubic meters of solution are used.

The gas leaving the washer is free from cyanogen compounds. It is treated with sulphuric acid for removing the ammonia and then passed into another washer which is supplied with a 30 per cent aqueous solution of the potassium salt of dimethylglycocoll. For each 1000 cubic meters of gas 1 cubic meter of this solution is used. In this treatment the contents of the gas in hydrogen sulphide are reduced from 12 grams to 0.05 gram per cubic meter. The spent washing solution is preheated in a heat exchanger to 85° C. and then led into a regeneration apparatus in which it is treated with direct steam whereby the hydrogen sulphide taken up is expelled. The regenerated hot solution passes through the heat exchanger and after further cooling is again supplied to the second washer.

The process may be carried through in a similar manner when using an aqueous solution of potassium carbonate for the preliminary purification stage.

When the efficiency of the polysulphide solution used in the first washing stage becomes lower, as for example by reason of an accumulation of ammonium thiocyanate in the solution, it may be increased by contacting it at any desired place with a gas comprising more hydrogen sulphide than the crude coke oven gas. For example, the concentrated hydrogen sulphide issuing from the regeneration apparatus of the second washing stage may be caused to act on the solution, for instance by introducing into the lower part of the sulphur container. Or part of the hydrogen sulphide issuing from the regeneration apparatus may be admixed with the crude coke oven gas to be treated. In this way a larger amount of polysulphide is formed in the solution and the removal of hydrocyanic acid is thereby improved.

Example 4

Blue water gas obtained by the gasification of brown coal and containing 18 per cent of carbon dioxide, 1 per cent of hydrogen sulphide and 0.1 gram of hydrocyanic acid and 0.04 gram of sulphur dioxide per cubic meter is trickled in a scrubbing tower with an aqueous sodium carbonate solution of 10 per cent strength. The solution leaving the tower is passed through a container charged with bog iron ore, then heated in a heat exchanger to between about 70° and about 80° C. and further heated by the supply of steam to between about 80° and about 90° C. Thereafter the solution is again passed through the heat exchanger and then returned to the scrubbing tower. In this way the cyanogen content of the gas is reduced from 0.1 to 0.001 gram per cubic meter and the sulphur dioxide is completely removed from the gas. In the scrubbing liquid sodium ferrocyanide and sodium sulphite are formed and gradually accumulated therein. From time to time fresh amounts of sodium carbonate are added in order to maintain the necessary amount of alkali in the solution. Each 1000 cubic meters of gas are treated with from 5 to 8 cubic meters of the solution.

The gas which has thus been subjected to a preliminary purification is then trickled in a second scrubbing tower with an aqueous solution of diamino-propanol of 25 per cent strength. When using 1 cubic meter of the liquid for each 200 cubic meters of gas the contents of the gas in carbon dioxide are reduced from 18 to 2 per cent. At the same time the contents in hydrogen sulphide are reduced from 1 to 0.05 per cent. The spent solution leaving the second scrubbing tower is preheated in a heat exchanger to 60° C. and then passed into a regeneration column in which by treatment with direct steam in counter current the carbon dioxide and hydrogen sulphide which have been taken up are expelled. The regenerated solution is cooled and then returned to the second scrubbing tower.

Instead of heating in the preliminary purification the whole of the soda solution only part thereof may be subjected to heating and after cooling may be reintroduced into the remainder of the soda solution.

What we claim is:

1. The process of washing out a weak gaseous acid from the class consisting of hydrogen sulphide and carbon dioxide from a gas containing the same in admixture with hydrocyanic acid and cyanogen, which comprises washing the gas in a first stage with a liquid alkaline agent selected from the class consisting of alkaline carbonates and hydroxides, thereby removing the hydrocyanic acid and cyanogen from the gas, washing the gas in a second stage with a substance selected from the class consisting of alkylol amines and alkali metal salts of amino carboxylic acids, thereby removing said weak gaseous acid from said gas, heating said substance to drive off said weak gaseous acid to thereby regenerate said substance and returning said substance to said second gas washing stage.

2. The process defined in claim 1 wherein said substance employed in the second stage is an alkylol amine.

HANS BAEHR.
HELMUT MENGDEHL.
WILHELM WENZEL.